United States Patent

Matsuzaki

[11] Patent Number: 5,351,606
[45] Date of Patent: Oct. 4, 1994

[54] BREAD BAKING DEVICE
[75] Inventor: Yoshiaki Matsuzaki, Daito, Japan
[73] Assignee: Funai Electric Co., Ltd., Daito, Japan
[21] Appl. No.: 98,448
[22] Filed: Jul. 27, 1993
[30] Foreign Application Priority Data Jul. 29, 1992 [JP] Japan ............................ 4-059072[U]

[51] Int. Cl.⁵ .................... A21D 2/00; A21D 8/00; A47J 27/00; A47J 37/00
[52] U.S. Cl. ........................ 99/348; 99/468; 366/98; 366/146; 366/314; 366/601; 310/62; 310/63
[58] Field of Search ............. 99/327, 329 R, 331, 99/332, 348, 352, 467, 468, 483; 366/144–146, 149, 69, 98, 205, 314, 343, 601; 310/50, 58, 60 R, 62, 63

[56] References Cited

U.S. PATENT DOCUMENTS

| | | | |
|---|---|---|---|
| 4,762,057 | 8/1988 | Hirota et al. | 99/329 R |
| 4,802,407 | 2/1989 | Negri et al. | 366/145 X |
| 4,844,048 | 7/1989 | Aruga et al. | 99/348 X |
| 4,903,587 | 2/1990 | Nagasaka et al. | 99/352 |
| 4,903,588 | 2/1990 | Horiuchi et al. | 366/98 X |
| 4,951,559 | 8/1990 | Arao et al. | 366/146 X |
| 4,957,040 | 9/1990 | Nakakura et al. | 99/331 X |
| 4,984,512 | 1/1991 | Takahashi et al. | 99/327 |
| 5,054,383 | 10/1991 | Cho | 99/468 X |
| 5,076,153 | 12/1991 | Takahashi et al. | 366/601 X |
| 5,145,252 | 9/1992 | Oh | 366/98 |

Primary Examiner—Timothy F. Simone
Attorney, Agent, or Firm—Lackenbach Siegel Marzullo Aronson & Greenspan

[57] ABSTRACT

This invention relates to a bread baking device, and is intended to attain the objective of providing a bread baking device having no exclusive cooling fan as an extra special part, and enabling low-cost production, by integrally shaping a cooling fan in one piece with a driving pulley mounted on the driving shaft of a driving motor, and by efficiently cooling the generated heat in said driving motor and the frictional heat generated in a belt by circulating air flow in accordance with the revolution of said driving motor. In said bread baking device transmitting driving force of said driving motor from said driving pulley to a kneading blade installed in a bread baking case through power transmitting members, said cooling fan integrally shaped in one piece with the axial end of said driving pulley, and an external housing having a plural of ventilating holes in a bottom plate thereof so as to be located under said driving motor and in a side wall thereof so as to be located above said driving motor are provided therein.

7 Claims, 2 Drawing Sheets

BREAD BAKING DEVICE

BACKGROUND OF THE INVENTION

This invention relates to a bread baking device, and, more particularly, to a bread-baking device enabling the direct cooling of the driving motor employed in bread baking devices that knead raw ingredients, and bakes a loaf of bread.

Generally, bread baking devices are provided with a kneading blade rotatively installed on the bottom of a baking case as well as a large pulley connected to the driving shaft of said kneading blade, a small driving pulley connected to the driving shaft of the driving motor which is generally installed in a bonnet and a timing belt is located between said large pulley and the small driving pulley.

The revolutions of said driving motor are transmitted to said kneading blade through said timing belt with a reduced speed. The bread baking device kneads the raw ingredients places in said baking case with this driving force, and then bakes said raw ingredients with heating means such as heaters. In this bread baking device, since it requires a large motor-driving load to knead said raw ingredients, as a consequence, the heat generated by the motor's speed and the frictional heat between said belt and pulleys becomes rather large. Accordingly, some cooling means for the driving motor is required.

Up to this time, there have been provided countermeasures such as installing a motor fan exclusively for cooling the driving motor, or providing heat-shielding plates around said driving motor to avoid heat transmission from the generated heat during said baking process.

Unfortunately, in such conventional bread baking device provided with said exclusive motor-cooling fan, said device entails a more complex construction and larger size, as well as an increase in the number of part members when said exclusive motor-cooling fan is installed, which in turn then incurs higher production costs.

Furthermore, as said exclusive motor-cooling fan is usually installed apart from said heat-generating pulleys, there is also a problem in that it is insufficient to cool the dissipated heat owing to the friction of said belt. Also in said baking device provided with the shielding plates, there is an additional problem in that the cooling efficiency is inferior so far as expecting only natural heat convection of said shielding plates.

Taking the above-mentioned problems into consideration, this invention was intended to attain the object of providing a bread baking device not having an exclusive cooling fan as an extra, special part, and consequently enabling the low-cost production, by integrally shaping said cooling fan in one piece with said driving pulley mounted on the driving shaft of said driving motor, and by efficiently cooling the generated heat in said driving motor and the frictional heat generated in said belt by circulating air flow in accordance with the speed of said driving motor.

SUMMARY OF THE INVENTION

In a bread baking device in which the driving force is transmitted to a kneading blade installed in a baking case through power transmitting members, this invention is characterized by having a cooling fan integrally shaped in one piece with an axial end of a driving pulley, and an external housing having a plurality of ventilating holes, each provided on a bottom plate under a driving motor and an upper side wall.

In said bread baking device embodying the invention, when said driving motor starts to rotate, said cooling fan which is integrally shaped in one piece with said driving pulley also starts to rotate, and an air flow is generated between said ventilating holes provided on the bottom plate and the side wall of said external housing. Accordingly, the generated heat in said driving motor and the frictional heat generated between said timing belt and said pulleys are outwardly discharged with said air flow, whereby said driving motor and said timing belt are effectively cooled.

As said cooling fan was integrated in one piece with said driving pulley, it is not necessary to furnish a cooling fan as an extra part.

DETAILED DESCRIPTION OF THE INVENTION

Figure 1:
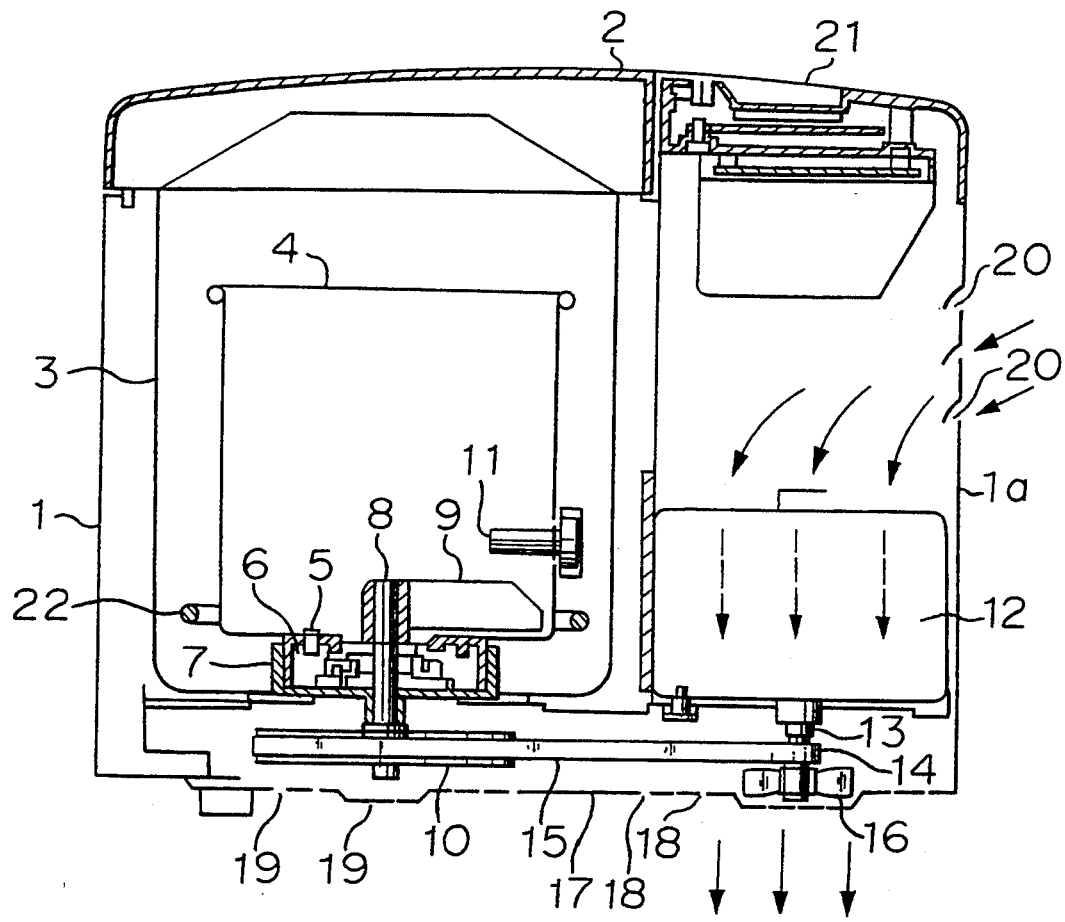
FIG. 1 shows a side view of the first embodiment of the bread baking device applying this invention.
Figure 2:
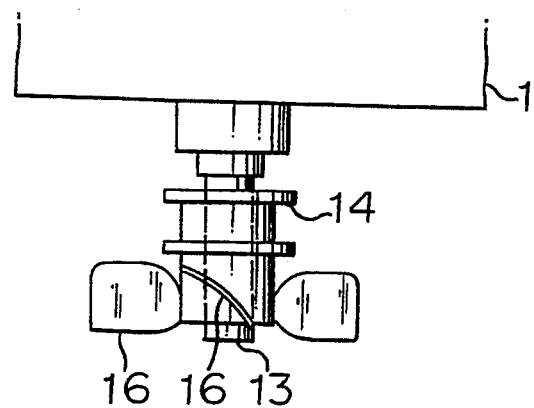
FIG. 2 shows a side view of the cooling fan and the driving pulley integrally shaped in one piece.
Figure 3:
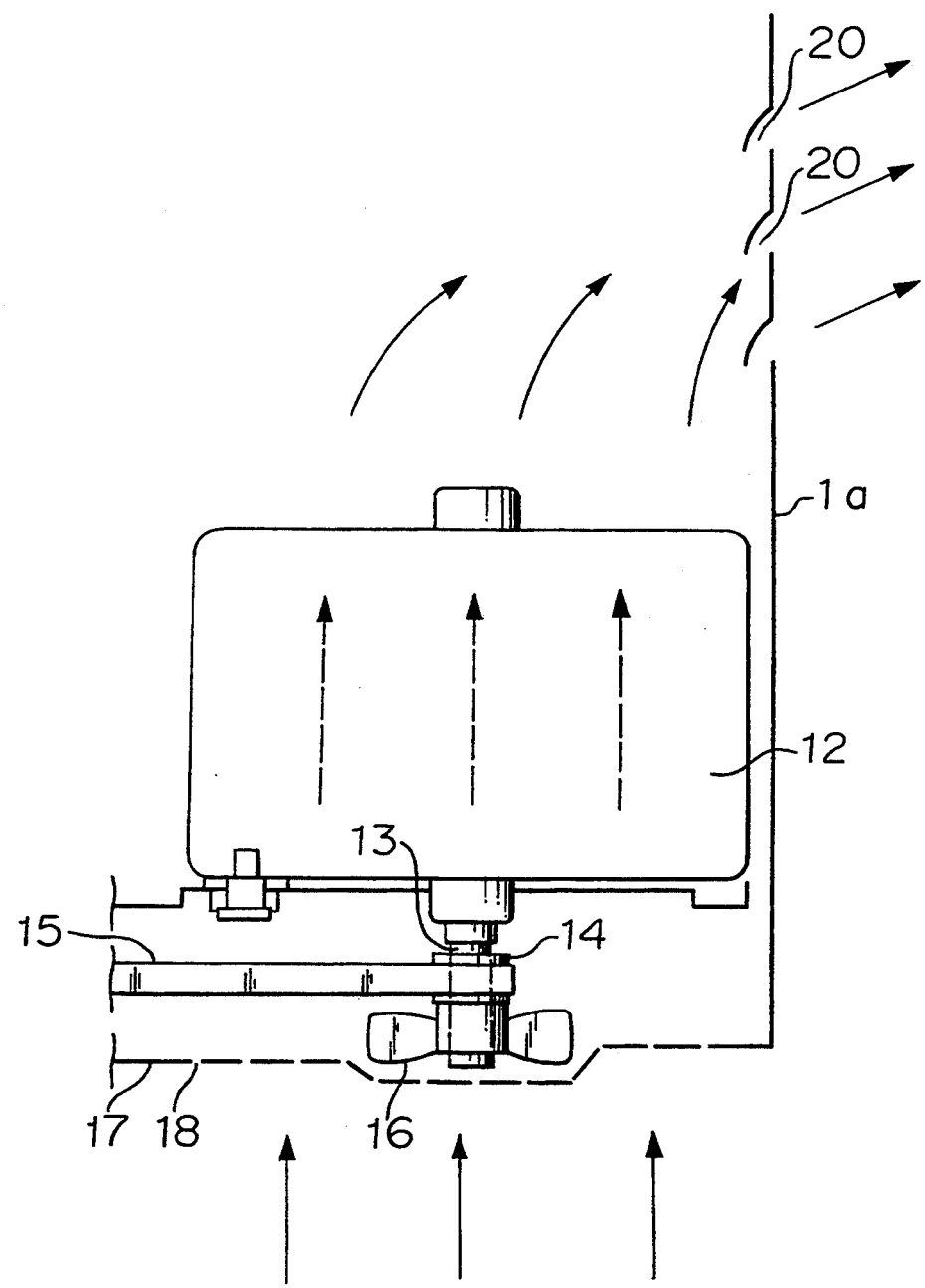
FIG. 3 shows a side view of the essential parts of the second embodiment.

Embodiments applying this invention are described in detail as follows with reference to the drawings. FIG. 1 and FIG. 2 show the first embodiment of the bread baking device applying this invention, and FIG. 3 shows the second embodiment.

First, the construction of this embodiment is described. In FIG. 1, a bonnet 1 composing the external housing, a canopy 2 covering said bonnet 1, an outer case of the baking chamber 3 mounted in said bonnet 1, a bread baking case 4 detachably installed in said outer case of the baking chamber 3 are respectively shown. A pin 5 outwardly extruding from the bottom of said baking case 4 engages with an engaging member 6, and said member 6 is detachably engaged with a reserving member 7 mounted on the bottom of said bonnet 1. On the lower part of said bread baking case 4, a bread kneading blade 9 is detachably installed on a shaft 8, and a large diametral pulley 10 is fitted on the bottom end of said shaft 8. The reference numeral 11 identifies a pin preventing the co-rotation of raw bread ingredients with said kneading blade 9, and numeral 22 identifies heating means installed around said baking case 4.

A driving pulley 14 acting as a power transmitting member is mounted on a shaft 13 of a driving motor 12 acting as a power generator and placed on the lower part of said bonnet 1. A timing belt 15 is hung between said driving pulley 14 and large diametral pulley 10. As shown in FIG. 2, a cooling fan 16 is integrally shaped in one piece with the bottom end of said driving pulley 14. On the bottom plate 17 of said bonnet 1, a plural of ventilating holes 18 and 19 are shaped to be positioned in the lower part of said driving motor 12 and said large diametral pulley 10, and, furthermore, on the side wall of said bonnet 1, a plural of louver-like shaped ventilating holes 20 are provided so as being positioned in the upper part of said driving motor 12. A numeral 21 identifies controlling means.

Next, the movements of said bread baking device are described as follows. According to the revolution of said driving motor 12, said revolution is transmitted from said driving pulley 14 to said large diametral pulley 10 with the reduced revolution through said timing belt 15, then said kneading blade 9 revolves through said shaft 8, and the raw bread ingredients are kneaded in said bread baking case 4. Said raw bread ingredients are able to avoid co-revolving with said kneading blade 9 owing to the collision with said co-revolving intercepting pin 11, and finally said raw ingredients are effectively kneaded in said bread baking case 4.

As said cooling fan 16 revolves in accordance with said driving pulley 14, an air flow directed with the arrow as shown in FIG. 1 is generated in said bonnet 1. Namely, as the air is drawn in said louver-like ventilating holes 20, said air further trespasses in and about said driving motor 12 and then is outwardly discharged from said ventilating holes 18 on said bonnet bottom plate 17, the generated heat in said driving motor 12 and frictional heat developed in said timing belt are thus effectively cooled.

In the second embodiment, as shown in FIG. 3, said air flow is composed so as to flow oppositely from said ventilating holes 18 and 19 to said ventilating holes 20. As the direction of said air flow is determined with relation of the direction of said fan blade and its revolving direction, it is enough to make only one kind of said cooling fan.

As described above, in this invention, by integrally shaping said cooling fan in one piece with said driving pulley, and by providing a plurality of ventilating holes in the bottom plate of said bonnet and said side wall, while moving said driving motor, said air flow is generated between said ventilating holes, and the heat generated in said driving motor and the frictional heat generated between said timing belt and pulleys are outwardly discharged, and thus it becomes possible to effectively cool said driving motor and said timing belt.

Also, as said cooling fan is integrally shaped in one piece with said driving pulley, it is not necessary to install a motor-cooling fan as an extra part. Accordingly, it is possible not only to simplify installation and reduce the manufacturing cost, but also effectively to activate said cooling fan for discharging the generated heat in said timing belt, as said cooling is locating near said heat-generating belt.

What I claim is:

1. In an improved bread baking machine having a driving motor and driving means, and a bread baking case with a driven means for driving a bread kneading blade, and transmission means between said driving and driven means, the improvement comprising a housing provided with louvers and a bottom plate of said housing having vent apertures, and an air cooling fan integrally formed as part of said driving means; said louvers and vent apertures being disposed substantially about said driving motor so as to discharge heat generated by said transmission means by the rotatable action of said cooling fan in moving air into and out of said housing.

2. The improved bread baking machine in claim 1, wherein said louvers are located in at least one side wall of said housing above said driving motor, and said vent apertures are located below said transmission means.

3. The improved bread baking machine in claim 2, wherein said driving means and driven means are pulleys, and said transmission means is a pulley belt.

4. The improved bread baking device in claim 3, wherein said pulley belt is a timing belt.

5. The improved bread baking device in claim 1, wherein said cooling fan comprises a plurality of blades, and the orientation of which or direction of rotation thereby enabling air flow to flow downwardly or upwardly through said housing.

6. The improved bread baking device in claim 2, wherein said vent apertures are located in said bottom plate.

7. The improved bread baking device in claim 6, wherein at least some of said vent apertures in said bottom plate are located below said driving motor and in the vicinity of said cooling fan.

* * * * *